US010458695B2

(12) United States Patent
Kim et al.

(10) Patent No.: US 10,458,695 B2
(45) Date of Patent: Oct. 29, 2019

(54) REFRIGERATOR

(71) Applicant: LG Electronics Inc., Seoul (KR)

(72) Inventors: Hyunbum Kim, Seoul (KR); Younseok Lee, Seoul (KR); Heejun Lee, Seoul (KR); Seongwon Gwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/069,348

(22) PCT Filed: Jan. 13, 2017

(86) PCT No.: PCT/KR2017/000448
§ 371 (c)(1),
(2) Date: Jul. 11, 2018

(87) PCT Pub. No.: WO2017/123033
PCT Pub. Date: Jul. 20, 2017

(65) Prior Publication Data

US 2019/0024966 A1 Jan. 24, 2019

(30) Foreign Application Priority Data

Jan. 14, 2016 (KR) ........................ 10-2016-0004832

(51) Int. Cl.
*F25D 23/02* (2006.01)
*F16H 1/20* (2006.01)
(Continued)

(52) U.S. Cl.
CPC .............. *F25D 23/028* (2013.01); *E06B 7/18* (2013.01); *F16H 1/20* (2013.01); *F25D 23/02* (2013.01);
(Continued)

(58) Field of Classification Search
CPC ........ F25D 23/028; F25D 23/02; F25D 25/02; F25D 29/003; F25D 2323/021; F25D 2700/02
See application file for complete search history.

(56) References Cited

U.S. PATENT DOCUMENTS

| | | | | |
|---|---|---|---|---|
| 9,909,800 B2 * | 3/2018 | Jung | ....................... | F25D 23/02 |
| 9,995,528 B1 * | 6/2018 | Ebrom | .................... | F25D 29/00 |

(Continued)

FOREIGN PATENT DOCUMENTS

| | | |
|---|---|---|
| KR | 10-2006-0075396 | 7/2006 |
| KR | 10-2006-0124954 | 12/2006 |

(Continued)

*Primary Examiner* — Hanh V Tran
(74) *Attorney, Agent, or Firm* — Fish & Richardson P.C.

(57) ABSTRACT

The present invention provides a refrigerator comprising a cabinet having a storage chamber; an inner case forming the exterior of the storage chamber; a first door pivotally provided to the cabinet and opening and closing one side of the storage chamber; a second door having a pillar rotated so as to come into contact with the first door, pivotally provided to the cabinet, and opening and closing the other side of the storage chamber; and a driving member provided at a lower end of the second door so as to move together with the second door, and operating the pillar so as to fold or unfold the pillar, wherein the pillar has a first catching protrusion and a second catching protrusion, which are selectively caught by the driving member.

20 Claims, 7 Drawing Sheets

(51) Int. Cl.

| | |
|---|---|
| ***E06B 7/18*** | (2006.01) |
| ***F25D 25/02*** | (2006.01) |
| ***F25D 29/00*** | (2006.01) |
| *F16H 1/16* | (2006.01) |

(52) U.S. Cl.

CPC ........... *F25D 25/02* (2013.01); *F25D 29/003* (2013.01); *F16H 1/16* (2013.01); *F25D 2323/021* (2013.01); *F25D 2700/02* (2013.01)

(56) References Cited

U.S. PATENT DOCUMENTS

| | | | | |
|---|---|---|---|---|
| 10,202,792 | B2 * | 2/2019 | Kim | E05F 15/619 |
| 10,260,797 | B2 * | 4/2019 | Kim | H02P 29/10 |
| 2011/0048060 | A1 * | 3/2011 | Kim | E05B 17/0029<br>62/449 |
| 2013/0241386 | A1 * | 9/2013 | Kim | A47B 71/00<br>312/404 |
| 2014/0159560 | A1 * | 6/2014 | Jung | F25D 23/028<br>312/405 |
| 2014/0265804 | A1 * | 9/2014 | Wilson | F25D 23/02<br>312/405 |
| 2014/0375198 | A1 * | 12/2014 | Jeon | F25D 23/028<br>312/404 |
| 2016/0018155 | A1 * | 1/2016 | Dubina | F25D 23/028<br>312/319.2 |
| 2016/0146528 | A1 * | 5/2016 | Yoon | F25D 23/028<br>62/277 |
| 2016/0178268 | A1 * | 6/2016 | Jung | E05F 1/10<br>312/404 |
| 2016/0273827 | A1 * | 9/2016 | Almeida | F25D 23/087 |
| 2016/0313050 | A1 * | 10/2016 | Yoon | E06B 7/18 |
| 2017/0191738 | A1 * | 7/2017 | Jung | E05C 5/00 |
| 2017/0234602 | A1 * | 8/2017 | Seo | F21V 33/00<br>348/151 |
| 2017/0321952 | A1 * | 11/2017 | Jung | F25D 23/02 |
| 2018/0010845 | A1 * | 1/2018 | Kim | F25D 23/02 |
| 2018/0045452 | A1 * | 2/2018 | Ji | F25D 11/00 |
| 2018/0209209 | A1 * | 7/2018 | Ham | E06B 7/215 |

FOREIGN PATENT DOCUMENTS

| | | |
|---|---|---|
| KR | 10-1522186 | 5/2015 |
| KR | 10-2015-0082065 | 7/2015 |
| KR | 10-2015-0084265 | 7/2015 |

* cited by examiner

REFRIGERATOR

CROSS-REFERENCE TO RELATED APPLICATIONS

This application is a National Stage application under 35 U.S.C. § 371 of International Application No. PCT/KR2017/000448, filed Jan. 13, 2017, which claims the benefit of Korean Application No. 10-2016-0004832, filed on Jan. 14, 2016. The disclosures of the prior applications are incorporated by reference in their entirety.

FIELD

The present disclosure relates to a refrigerator, more particularly, a refrigerator which may open one storage chamber by using two side-by-side doors so as to enhance use convenience.

BACKGROUND

Generally, a refrigerator is an electric appliance configured to store foods in a fresh state for a preset time period by chilling the foods stored in a storage chamber (a freezer compartment and a refrigerator compartment), while repeating a freezing cycle.

A compressor is provided in the refrigerator to compress the refrigerant circulating the freezing cycle into a high-temperature-and-high-pressure refrigerant. The refrigerant compressed in the compressor may generate cold air while passing through a heat exchanger and the generated cold air may be supplied to the freezer or refrigerator compartment.

Such the refrigerator usually includes the freezer compartment mounted on a top and the refrigerator compartment mounted on a bottom. A side by side type has the refrigerator compartment and the freezer compartment mounted side by side.

As a further type, a two-door type refrigerator has two doors which are provided to open and close one storage chamber provided in an upper or lower portion.

In case such two doors are provided to open and close one storage chamber, a pillar is installed in one of them. The pillar is provided one of the two doors and able to contact with the two doors once the two doors closes the storage chamber, only to enhance a degree of the tight closing of the storage chamber.

In the prior art to which the present invention pertains, the conventional refrigerator further include a projection and a guide groove which are provided in an inner case and configured to guide the rotation of the pillar.

In the conventional refrigerator, the structure for guiding the rotation of the pillar has to be projected downwardly from a top of the inner case such that the user could feel uncomfortable in using the storage chamber.

Moreover, in a state where the door having the pillar has closed the storage chamber, the pillar is unfolded out of the corresponding door so as to interfere a passage of a drawer installed in the refrigerator. Accordingly, the widths of the drawers disadvantageously have to be changed in a state where two drawers are arranged side by side.

Also, in a state where the pillar is unfolded, a basket provided in the door has to have gently curved corners not to contact with the pillar when rotating together with the door. Accordingly, the storage capacity of the basket cannot help decreasing disadvantageously.

DETAILED DESCRIPTION OF THE INVENTION

Technical Problem

To overcome the disadvantages, an object of the present disclosure is to provide a refrigerator which may open one storage chamber by using two side-by-side doors so as to enhance use convenience.

Technical Solution

To achieve these objects and other advantages and in accordance with the purpose of the embodiments, as embodied and broadly described herein, a refrigerator comprises a cabinet comprising a storage chamber; an inner case which defines the exterior of the storage chamber; a first door rotatably coupled to the cabinet and configured to open and close one side of the storage chamber; a second door comprising a pillar rotatable to contact with the first door, the second door rotatably coupled to the cabinet and configured to open and close the other side of the storage chamber; a driving member installed in a lower end of the second door and movable together with the second door, the driving member configured to fold or unfold the pillar, wherein a first protrusion and a second protrusion are formed in the pillar and configured to be selectively coupled to the driving member, and in a state where the second door closes the storage chamber tight, the pillar is arranged distant from an upper wall and a lower wall of the inner case not to contact with the inner case.

The refrigerator may further comprise a first door switch configured to sense the opening and closing of the first door; a second door switch configured to sense the opening and closing of the second door, wherein the driving member rotates the pillar to fold it, when one of the first and second door switches sense the door opening.

The refrigerator may further comprise a first door switch configured to sense the opening and closing of the first door; and a second door switch configured to sense the opening and closing of the second door, wherein the driving member rotates the pillar to unfold it, when both of the first and second door switch sense the door opening.

The first protrusion and the second protrusion may be arranged at the different heights in a perpendicular direction of the pillar.

The driving member may comprise a first link configured to selectively contact with the first protrusion; and a second link configured to selectively contact with the second protrusion.

The first link and the second link may be arranged to have different heights, respectively.

The driving member may comprise a motor which is rotatable in a forward direction or reverse direction; and a transmission unit configured to transmit the rotation of the motor to the first link and the second link.

The transmission unit may comprise a first gear configured to receive a rotation force from the motor; a second gear configured to engage with the first gear; and a third gear rotatable in the same direction together with the second gear.

The second gear may comprise a first extension configured to selectively contact with the first link, and the third gear comprises a second extension configured to selectively contact with the second link.

The refrigerator may further comprise a worm gear configured to transmit the rotation of the motor to the first gear, wherein a rotation axis of the motor is arranged perpendicular to a rotation axis of the first gear.

The driving member may comprise a case defining the exterior, and the case comprises a first projection and a second projection, and the first projection is connected with the first link by a first elastic member, and the second projection is connected with the second link by a second elastic member.

A through-hole may be provided in the case, and the first link and the second link contact with the pillar via the through-hole.

The refrigerator may further comprise a sensor configured to sense whether the pillar is rotated.

When the sensor senses that the pillar is not rotated to be in a preset state, the driving member may be driven again.

A basket may be provided above the driving member.

Advantageous Effects

The embodiments have following advantageous effects. The refrigerator has not structure projected toward the storage chamber to rotate the pillar. Accordingly, the capacity of the storage chamber may be enlarged and the user may not feel uncomfortable with the projected structure.

In a state where only the door having the pillar is closed while the other door opens the storage chamber, the pillar is folded. Accordingly, when pulling out the drawer installed in the other door, the drawer will not be caught by the pillar and the widths of the drawers installed in the two doors may be the same.

In a state where only the door having the pillar is closed while the other door opens the storage chamber, the pillar is folded. When the user rotates the other door, the basket will not be caught by the pillar. Accordingly, the corners of the basket may be formed angular and the storage capacity of the basket may be enlarged.

The folding or unfolding of the pillar is determined by using the door switch configured to sense the door opening and closing. Accordingly, the reliability of the pillar operation may be enhanced.

DESCRIPTION OF SPECIFIC EMBODIMENTS

Referring to the accompanying drawings, exemplary embodiments of the present disclosure will be described in detail.

Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
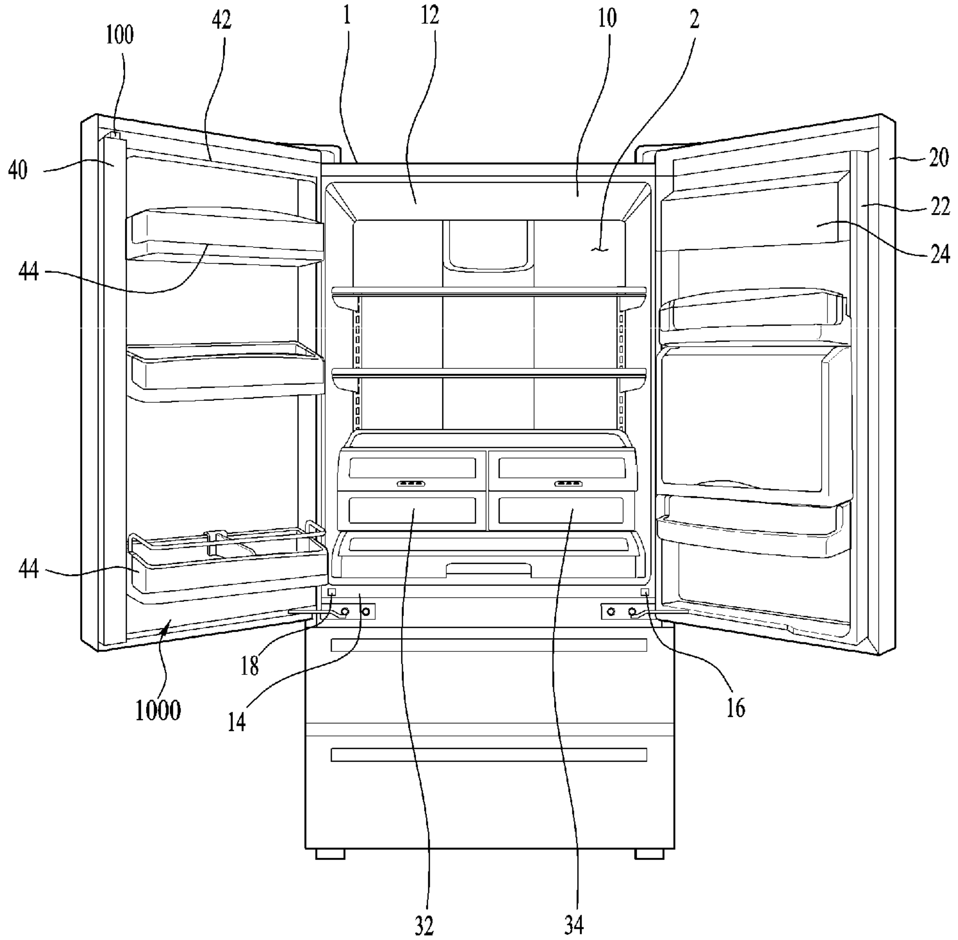
FIG. 1 is a front view of a refrigerator in accordance with one embodiment of the present disclosure.

FIG. 1 is a front view of a refrigerator in accordance with one embodiment of the present disclosure.

Referring to FIG. 1, the refrigerator in accordance with the embodiment includes a cabinet 1 which defines the exterior of the refrigerator.

A storage chamber 2 is provided in the cabinet 1 to store foods.

The storage chamber 2 may be defined by an inner case 10 provided in the cabinet. The inner case 10 may include an upper wall 12 and a lower wall 14 to finish inner surfaces of the storage chamber 2. A front surface of the storage chamber 2 may be open to allow access to the storage chamber to the user. The upper wall 12 means the ceiling 12 of the storage chamber 2 or inner case 10.

A first door 20 for opening one side of the storage chamber 2 and a second door 40 for opening the other side of the storage chamber 2 are rotatably coupled to the front surface of the cabinet 1. In this instance, when the first door 20 and the second door 40 close the front surface of the storage chamber 2, the storage chamber 2 may be entirely closed tight.

The second door 40 may include a pillar 100 rotatable to contact with the first door 20. The pillar 100 may be formed in a rectangular parallelepiped shape and rotatably coupled to the second door so as to rotate with respect to the second door 40. In this instance, the pillar 100 may be rotatable with respect to the second door 40 at a different angle according to a rotation angle of the second door 40 with respect to the storage chamber 2 or whether the first door 20 opens the storage chamber 2.

The pillar 100 has a shorter length than a gap between the upper wall 12 and the lower wall 14 not to contact with the walls of the inner case 10. In other words, even when the rotating second door 40 closes the storage chamber 2, the pillar 100 will not contact with both of the upper and lower walls 12 and 14. The upper wall 12 and the lower wall 14 are able to form a flat surface, because no elements capable of restricting the rotation of the pillar 100 are arranged therein.

A pillar projection 130 may be provided in an upper area of the pillar 100 and the pillar projection 130 are also projected not to contact with the upper wall 12, in other words, the ceiling 12.

The first door 20 may include a door dike 22 which defines a rear exterior of the first door 20. The second door 40 may also include a door dike 42 which defines a rear exterior of the second door 40.

Baskets 44 and 24 may be installed in the door dikes 42 and 22, respectively, and it is possible to store diverse kinds of foods in the baskets 44 and 24. At this time, the basket 44 provided in the first door 20 having no pillar 100 will not be interfered with such that corners of those basket 24 can be formed angular. Accordingly, more foods may be stored in the basket 24 than the basket having curved corners.

The storage chamber 2 may include a first drawer 34 arranged toward the first door 20; and a second drawer 32 arranged toward the second door 40. In this instance, the first drawer 34 and the second drawer 32 may be arranged on the same horizontal plane. In other words, the first drawer 34 and the second drawer 32 may be arranged in the storage chamber 2 at the same height side by side. The first drawer 34 and the second drawer 32 may be extractable independently.

The first drawer 34 and the second drawer 32 may have the same width. In other words, they may have the same storage capacity and be used in substitution for each other. If they are formed in different shapes with the different widths, respectively, the first drawer 34 and the second drawer 32 have to be manufactured differently and the manufacturing costs could rise. In contrast, if the two drawers are formed in the same shape, the manufacturing costs fall advantageously.

In the embodiment of the present disclosure, when the user pulls out the first drawer 34 after opening the first door 20, the pillar 100 may not be arranged on the passage of pulling out the first drawer 34 and the function mentioned above can be realized. The reason why the pillar 100 is not arranged on the passage of the first drawer 34 will be described later in detail, referring to other drawings.

Meanwhile, in the embodiment of the present disclosure, the first door 20 and the second door 40 are formed at the same width. Accordingly, the manufacturing process and the manufacturing process of the second door 40 are partially shared, so as to lower the cost of the door production. The reasons will be described, referring to other drawings.

A driving member 1000 may be provided in the second door 40 and configured to rotate the pillar 100. The driving member 1000 may be provided in a lower portion of the second door 40 and rotatable together with the second door 40, when the second door 40 is rotated. Accordingly, the driving member 1000 may rotate the pillar 100, regardless of the positions of the rotating second door 40.

The refrigerator in accordance with the embodiment may further include a first door switch 16 configured to sense the opening and closing of the first door 20; and a second door switch 18 configured to sense the opening and closing of the second door 40. The first door switch 16 may sense whether the first door 20 opens or closes the storage chamber 2. The second door switch 18 may sense whether the second door 40 opens or closes the storage chamber 2.

When it is sensed that the first door 20 is pressing the first door switch 16, it may be determined that the first door 20 is closing the storage chamber 2. When it is sensed that the second door 40 is pressing the second door switch 18, it may be determined that the second door 40 is closing the storage chamber 2.

Figure 2:
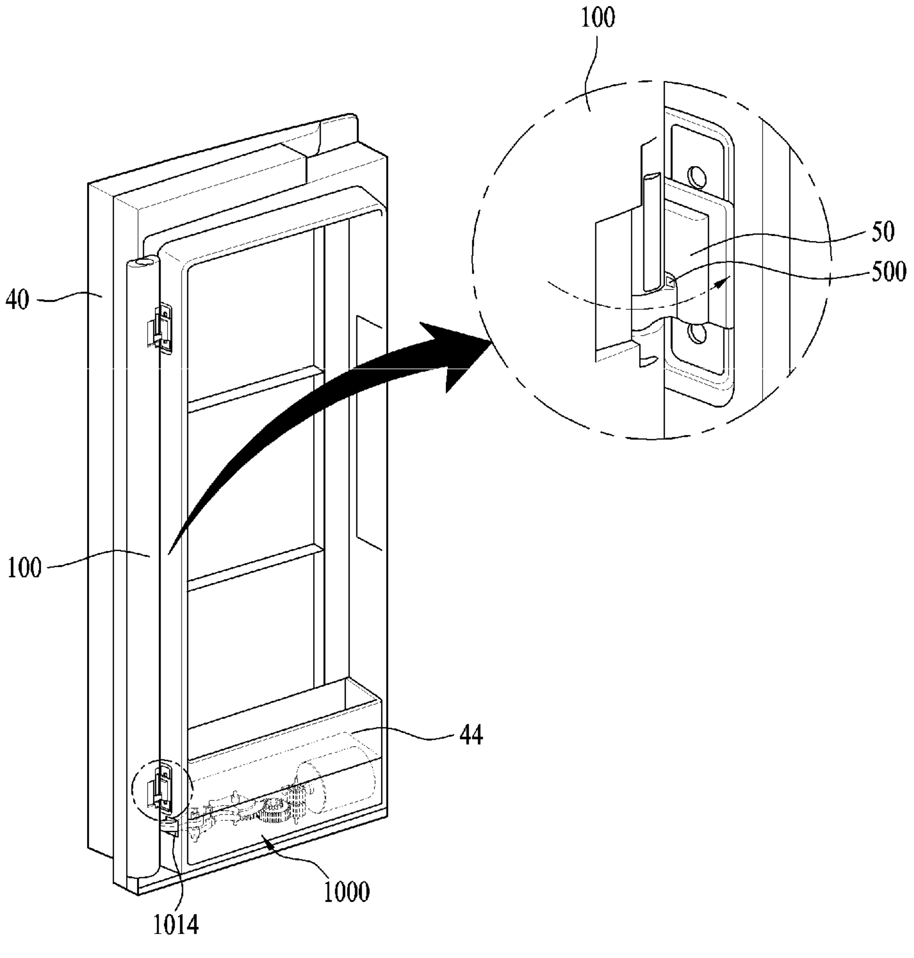
FIG. 2 is a diagram illustrating an inside of a second door provided in the refrigerator.

FIG. 2 is a diagram illustrating the inside of the second door.

Referring to FIG. 2, the pillar 100 is provided in the second door 40.

The pillar 100 may be rotatable in a state of being fixed to a pillar fixing unit 50 provided in the second door 40.

The pillar fixing unit 50 may apply a force to the pillar 100 in both directions (a direction in which the pillar is folded and the other direction in which the pillar is unfolded). The pillar fixing unit 50 may be configured of a spring, a rotation cam assembly or other diverse configurations.

More specifically, once it is rotated at a preset angle, the pillar 100 is induced to be folded. Once rotated at another preset angle, the pillar is induced to be unfolded.

As the pillar fixing unit 50 applies the force along the direction in which the pillar is folded, the fluttering of the pillar 100 generated after opening the second door 40 having the unfolded pillar 100. As the pillar fixing unit 50 consistently applies the force to the pillar 100 to keep the folded state, the vibration or noise generated by the free moving of the pillar 100 may be prevented.

In addition, as the pillar fixing unit 50 applies the force in the direction where the pillar 100 is folded, an auxiliary force can be provided to fold the pillar 100 when the first door 20 is opening. When the first door 20 is open in a state where the second door 30 closes the storage chamber 2, the unfolded state of the pillar 100 is changed into the folded state.

As the pillar fixing unit 50 applies the force in the direction where the pillar 100 is being unfolded, the unfolded pillar 100 is allowed to contact with the first door 20 so as to substantially close the storage chamber 2 tight.

A sensor 500 may be provided in the pillar fixing unit 50 to sense the rotation of the pillar 100. The sensor 500 may include a hall sensor and sense whether the pillar 100 is rotated or not.

The sensor may also only whether the pillar 100 is unfolded or folded. In other words, when the pillar 100 hides the sensor 500, the sensor 500 senses that the pillar 100 is unfolded. Unless the pillar 100 hides the sensor 500, the sensor 500 senses that the pillar is unfolded.

Based on the information sensed by the sensor 500, the sensor 500 is able to sense whether the pillar 100 is folded or unfolded. Accordingly, the reliability of the sensing result on whether the pillar 100 is rotated or not may be enhanced.

The driving member 1000 is provided in a lower end portion of the second door 40 and then always able to access to the pillar 200 from the same position. Unless the driving member 1000 is installed in the second door 40, the area of the second door 40 supposed to contact with the pillar 100 may vary with the rotation angle of the second door 40 and the reliability of the rotation of the pillar 100 could deteriorate disadvantageously. In the embodiment, the distance or gap between the second door 40 and the pillar 100 is always kept uniform such that the area where the driving member 1000 is configured to contact with the pillar 100 may become uniform, only to stably rotate the pillar 100.

The driving member 1000 includes a case 1010 which defines the overall exterior and the elements configured to drive the driving member 1000 are inserted in the case 1010.

A through-hole (1014, see FIG. 3) is formed in one surface directed to the pillar 100 in the case 1010 and then some of the inner elements provided in the case 1010 may contact with the pillar 100 so as to rotate the pillar 100.

A basket 44 may be provided on the case 1010 such as to makes it difficult for the user to see the case 1010 easily. The user's height is typically over the basket 44. When the user is looking down, the case 1010 is arranged under the basket 44 and covered by the basket 44. Accordingly, the user cannot directly access to the elements configured to rotate the pillar 100 and the error of the driving member 1000 generated by the user trying to operate the driving member 1000 directly may be prevented.

The specific elements of the driving member 1000 will be described in detail, referring to FIGS. 3 and 4.

Figure 3:
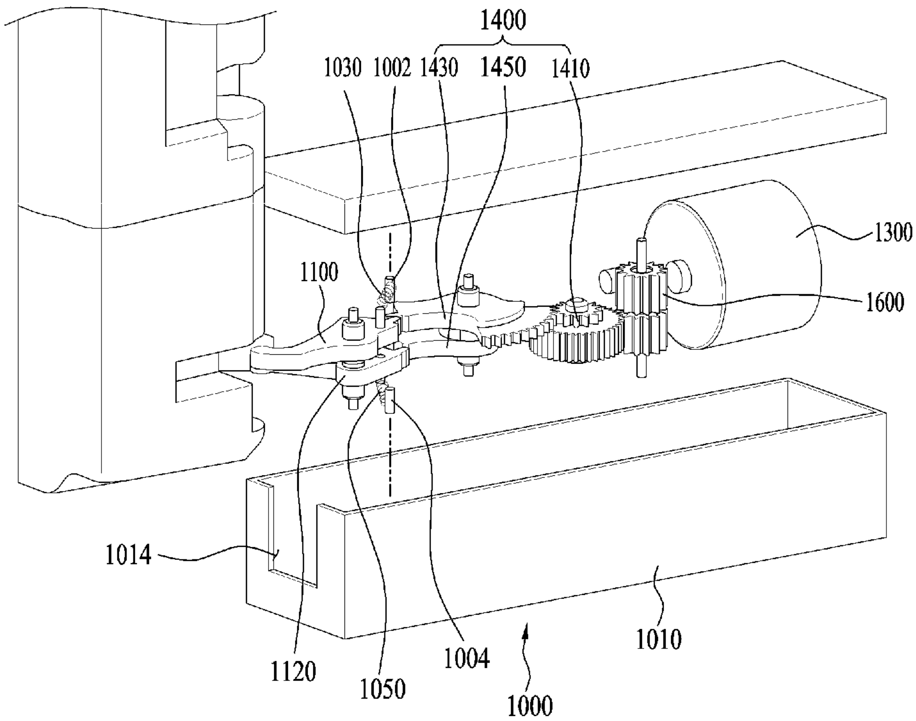
FIG. 3 is a diagram illustrating a driving member.

FIG. 3 is a diagram illustrating the driving member. FIG. 4 is a partial diagram of FIG. 3, viewed from a different direction. FIG. 5 is a diagram illustrating a first protrusion and a second protrusion which are formed in the pillar.

Figure 4:
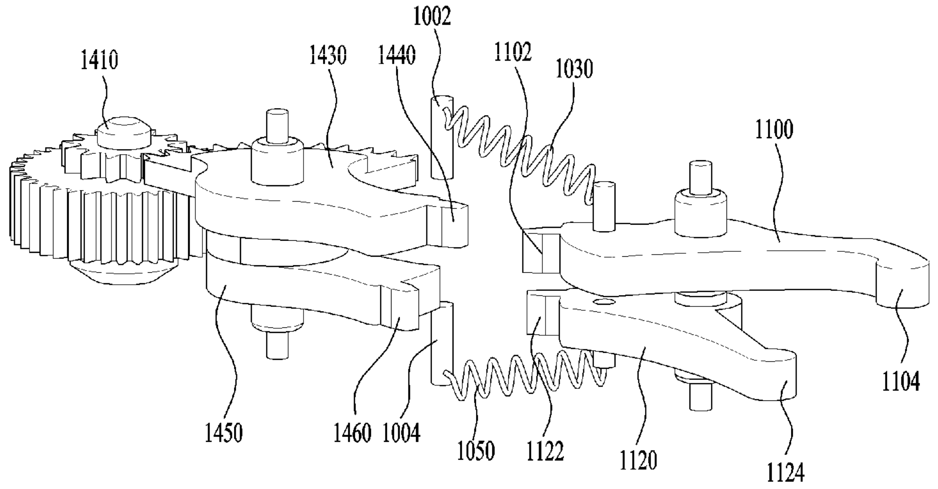
FIG. 4 is a partial diagram of FIG. 3, viewed from a different direction.
Figure 5:
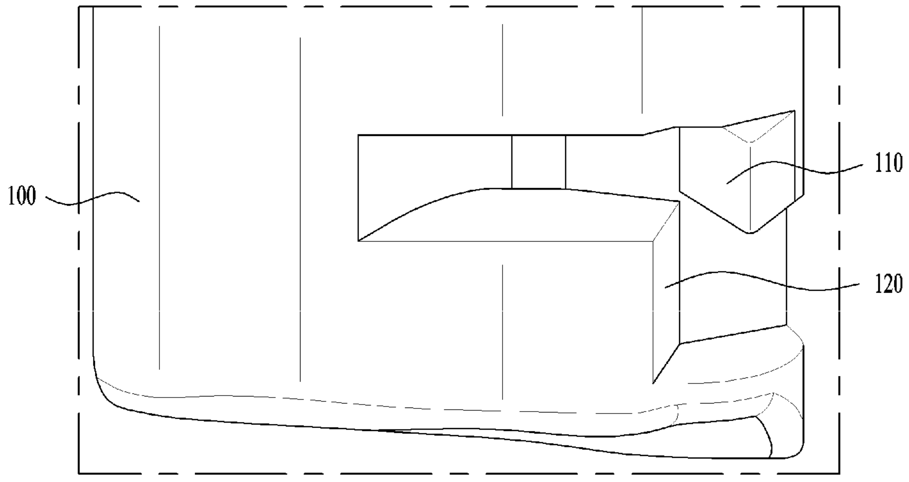
FIG. 5 is a diagram illustrating a first protrusion and a second protrusion which are formed in a pillar.

Referring to FIGS. 3 and 4, the driving member 1000 includes the case 1010 defining the exterior of the driving member 1000. The case 1010 may include a body having an internal space; and a cover provided to close a top of the body tight.

The driving member 1000 includes a first link 1100 and a second link 1200 which are configured to selectively contact with the pillar 100. The first link 1100 and the second link 1200 may contact with different areas of the pillar 100 so as to rotate the pillar 100 in different directions.

The driving member 1000 includes a motor 1300 configured to provide a rotational force. The motor 1300 may be rotatable in a clockwise or counter-clockwise direction. As necessity occurs, the motor is able to provide a forward-direction rotation force or the reverse-direction rotation force.

The motor 1300 may have a rotation axis which is arranged parallel to a horizontal direction such that the longitudinal width of the driving member 1000 may not increase. As the driving member 1000 becomes thicker in a longitudinal direction, the basket 44 becomes higher enough to reduce the amount of the foods which can be stored in the second door 40. If possible, it is preferred that the longitudinal width of the driving member 1000 decreases to reduce the volume of the driving member 1000.

A transmission unit 1400 is provided to transmit the rotation force of the motor 1300 to the first and second links 1100 and 1120.

The transmission unit 1400 includes a first gear 1410 configured to receive the rotation force from the motor; a second gear 1430 configured to engage with the first gear 1410; and a third gear 1450 rotatable in the same direction together with the second gear 1430.

A worm gear 1600 may be provided in a front end of the motor 1300 and configured to change the rotation direction of the motor 1300. A rotation axis of the worm gear 1600 is arranged perpendicular to the rotation axis of the motor 1300 so as to arrange the rotation axis of the motor 1300 laid on the horizontal surface.

The worm gear 1600 may be configured of two gears which include one gear unit configured to change the rotation direction of the motor 1300; and the other gear unit integrally formed with the gear unit and configured to transmit the rotation force to the first gear 1410. The two gear units of the worm gear 1600 are rotatable in the same direction at the same speed.

The first gear 1410 may include one gear unit which is rotatable with engaging with the gear unit of the worm gear 1600; and another gear unit which is provided over the gear unit and configured to engage with the worm gear 1600. The two gear units provided in the first gear 1410 have a different number of teeth, respectively, so as to vary the rotation force and speed of the worm gear 1600 into different rotation forces and speeds.

The first gear 1410 and the worm gear 1600 have parallel axes to each other so as to transmit the rotation force of the worm gear 1600 to the first gear 1410.

The third gear 1450 is coupled to the second gear 1430 which is configured to engage with the first gear 1410. The second gear 1430 and the third gear 1450 are installed at different heights, respectively, while they are rotatable together. In other words, the second gear 1430 and the third gear 1450 are integrally formed with each other. Once the second gear 1430 is rotated in the clockwise direction, the third gear 1450 is also rotated in the clockwise direction at the same angle. While, once the second gear 1430 is rotated in the counter-clockwise direction, the third gear 1450 is also rotated in the counter-clockwise direction at the same angle.

The second gear 1430 and the third gear 1450 are rotated on the same rotation axis. In other words, the teeth of the first gear 1410 engage with the second gear 1430 such that the rotation force and direction of the first gear 1410 are transmitted to the second gear 1430 and the third gear 1450.

A first extension 1440 extends from the second gear 1430 and a second extension 1460 extends from the third gear 1450. The first extension 1440 and the second extension 1460 extend to be apart from the axes in a radial direction. Accordingly, rotation radii of the first and second extension 1440 and 1460 may be longer than the other portions of the second and third gears 1430 and 1450.

The first extension 1440 may extend enough to contact the first link 1100 and the second extension 1460 may extend enough to contact with the second link 1120. Accordingly, the first extension 1440 may contact with the first link 1100 or the second extension 1460 may contact with the second link 1120, based on the rotation angles of the second and third gears 1430 and 1450.

The driving member 1000 may include a first projection 1002 and a second projection 1004. The first projection 1002 is connected with the first link 1100 by a first elastic member 1030 and the second projection 1004 is connected with the second link 1120 by a second elastic member 1050. The first elastic member 1030 and the second elastic member 1050 have a restoring force to be tensioned when an external force is applied to them and go back to the original positions when the external force is removed. Accordingly, the first and second links 1100 and 1120 rotated by the external force may go back to their original positions when the external force is removed.

A third extension 1102 is formed in the first link 1100 and configured to selectively contact with the first extension 1440. The third extension 1102 is projected from the rotation axis of the first link 1100 toward the motor 1300 to contact with the first extension 1440 in a preset range of rotation angles.

A first contact piece is formed in the first link 1100 and configured to contact with the pillar 100. The first contact piece 1104 is formed in the opposite side of the third extension 1102 with respect to the rotation axis of the first link 1100.

A fourth extension 1122 is formed in the second link 1120 and configured to selectively contact with the second extension 1460. The fourth extension 1122 is projected from the rotation axis of the second link 1120 toward the motor 1300 to contact with the second extension 1460 in a preset range of rotation angles.

A second contact piece 1124 is formed in the second link 1120 and configured to contact with the pillar 100. The second contact piece 1124 is formed in the opposite side of the fourth extension 1122 with respect to the rotation axis of the second link 1120.

More specifically, after it is transmitted to the worm gear 1600 and the first gear 1410 sequentially, the rotation force of the motor 1300 is transmitted to the second gear 1430 and the third gear 1450.

If occasion rises, the rotation force of the motor is selectively transmitted to the first link 1100 and the second link 1120 so as to rotate the pillar 100.

The first link 1100 and the second link 1120 are arranged to have different heights, respectively. When looking down, the first link 1100 and the second link 1120 are overlapped with each other. Accordingly, when looking down at the driving member 1000, the vertical width of the driving member 1000 may decrease and the projected length of the rear portion of the second door 40 toward the storage chamber 2 may decrease. Accordingly, the interference generated in the storage chamber 2 when the second door 40 is rotated may be prevented from increasing.

Referring to FIG. 5, a plurality of protrusions may be formed in a lower portion of the pillar 100 to be coupled to the driving member 1000.

A first protrusion 110 is formed in the lower portion of the pillar 100 to be coupled to the first contact piece 1104 by contact. A guide groove is recessed from a front area of the first protrusion 110 toward the pillar 100 to the preset depth such that the first contact piece 1104 contacting with the first protrusion 110 can rotate the pillar 100.

A second protrusion 120 is formed in the lower portion of the pillar 100 to be coupled to the second contact piece 1124 by contact. A guide groove is recessed from a front area of the second protrusion 120 toward the pillar 100 to the preset depth such that the second contact piece 1124 contacting with the second protrusion 120 can rotate the pillar 100.

The first protrusion 110 and the second protrusion 120 are arranged at different heights in a perpendicular direction with respect to the pillar 100, corresponding to the first link 1100 and the second link 1120 which are arranged at the different heights.

Figure 6:
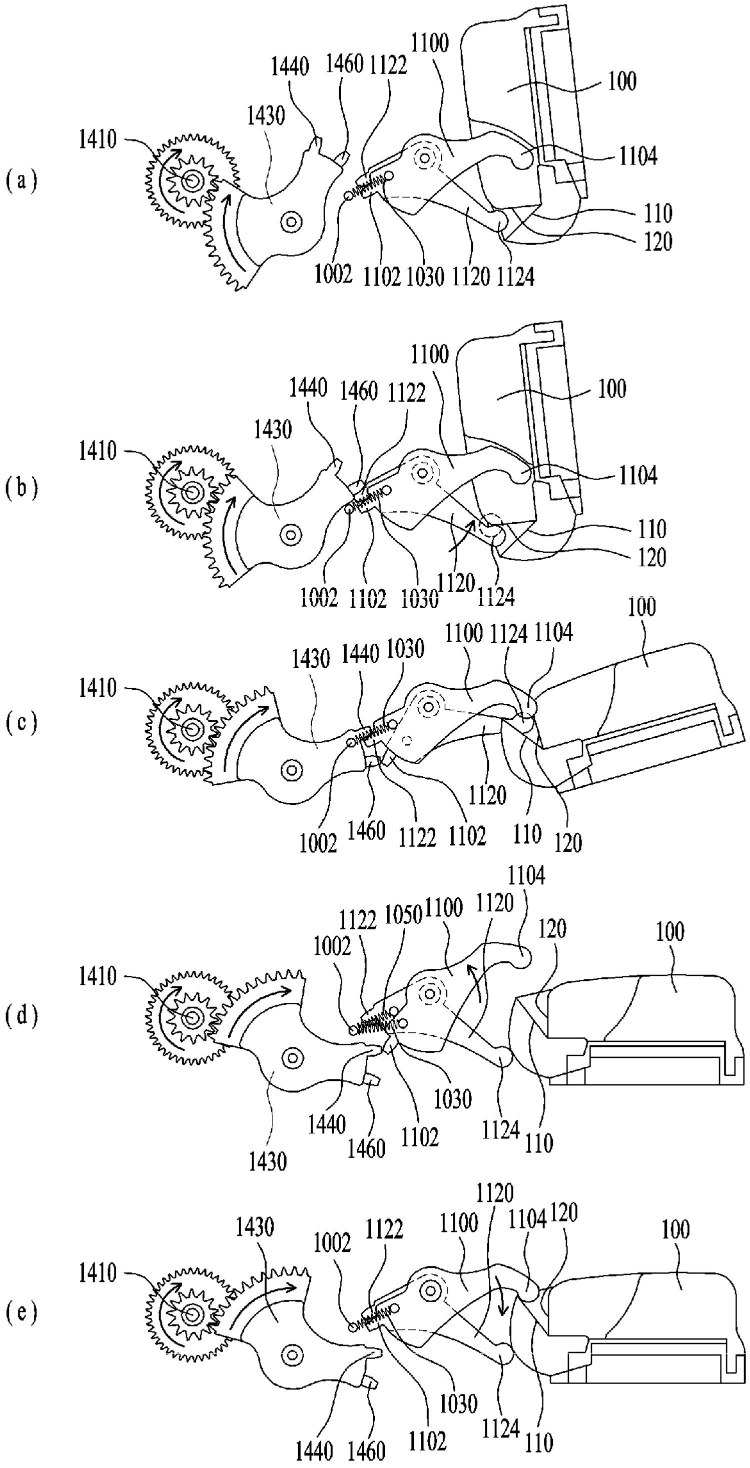
FIG. 6 is a diagram illustrating an operation that the pillar is being unfolded.

FIG. 6 is a diagram illustrating an operation that the pillar is being unfolded.

Once both of the first and second door switches 16 and 18 sense the door closing, the operation for unfolding the pillar 100 starts. More specifically, when the user rotates the first door 20 and the second door 40 to close the storage chamber 2, the first door 20 and the second door 40 closes the storage chamber 2 tight. At this time, the pillar 100 gets unfolded to close the storage chamber 2 and has to contact both of the first and second doors 20 and 40.

As the user is rotating the closed doors, the pillar 100 has to be folded in an early stage.

As shown in FIG. 6*a*, the motor 1300 gets rotated in the forward direction to rotate the first gear 1410 in the counter-clockwise direction. When the first gear 1410 is rotated in the counter-clockwise direction, the second gear 1430 and the third gear 1450 are rotated in the clockwise direction while engaging with the first gear.

As the rotation angle of the first gear 1410 becomes larger, the second extension 1460 is coupled to the fourth extension 1122 by contact as shown in FIG. 6*b*. Accordingly, the first link 1100 is not rotated and the second link 1120 is rotated in the counter-clockwise direction. The second contact piece 1124 of the second link 1120 is coupled to the second protrusion 120 by contact, and the pillar 100 then gets rotated in the unfolded direction.

As shown in FIGS. 6*c* and 6*d*, the rotation angle of the first gear 1410 becomes larger and the first extension 1440 is then coupled to the third extension 1102 by contact. In this instance, the second link is not rotated and the first link 1100 is rotated in the counter-clockwise direction such that the first link 1100 may get out of the locus of the rotating pillar 100 not to interfere with the rotation of the pillar 100.

At this time, the external force applied to the second link 1120 by the third gear 1450 is removed and the tensioned second elastic member 1050 goes back to the original size to restore the second link 1120 to the original position.

As shown in FIG. 6*e*, the rotation angle of the first gear 1410 becomes larger and the contact between the first extension 1440 and the third extension 1102 ends such that the first link 1100 may be then restored to the original position by the first elastic member 1030.

More specifically, the first link 1100 and the second link 1120 are rotated while coupled to the second gear 1430 and the third gear 1450 by contact. Once the contact coupling is released, the first link 1100 and the second link 1120 are restored to the original positions by the restoring forces of the first and second elastic members 1030 and the 1050.

Figure 7:
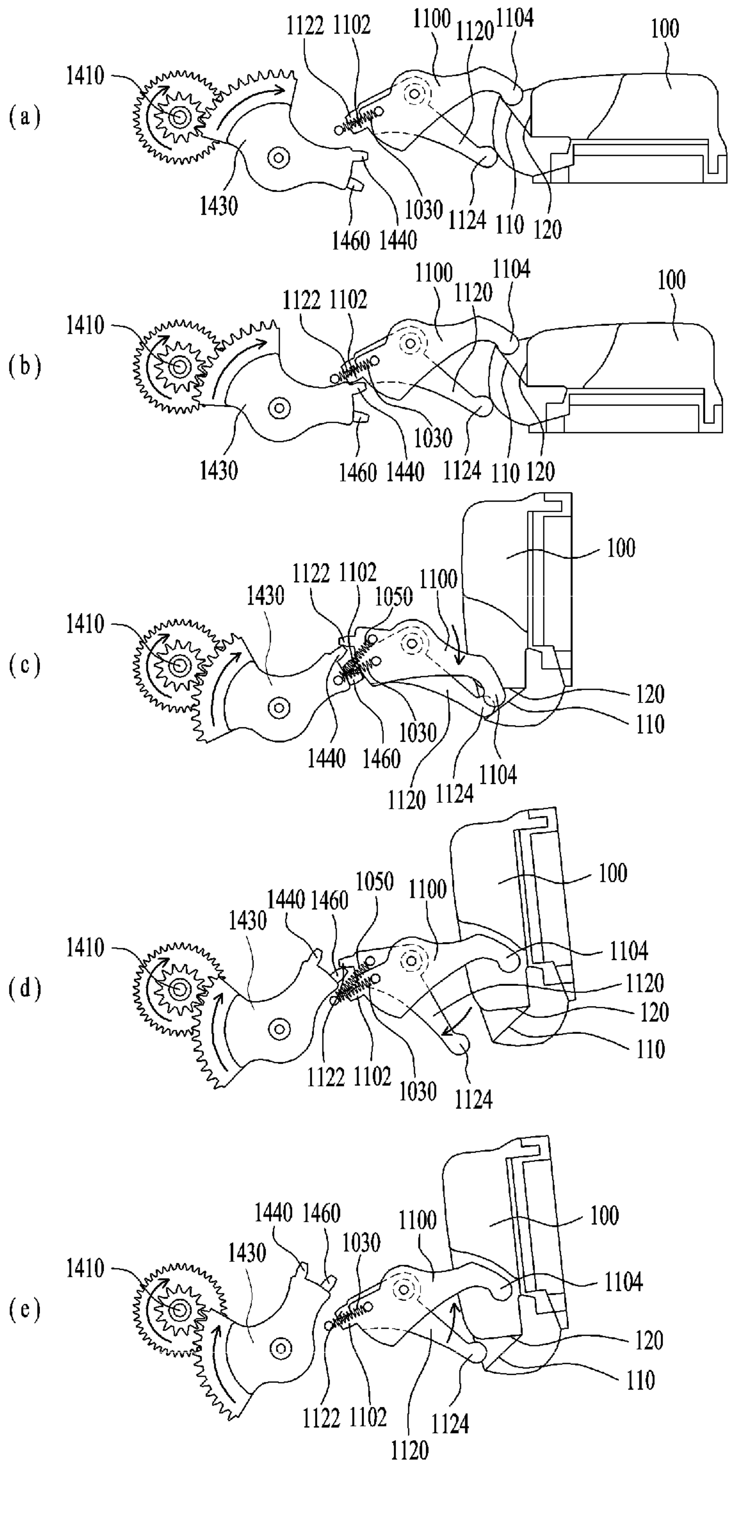
FIG. 7 is a diagram illustrating an operation that the pillar is being folded.

FIG. 7 is a diagram illustrating an operation that the pillar is being folded.

Once the first door switch 16 or the second door switch 18 senses the door opening, the pillar 100 is rotated to be folded. In other words, the pillar 100 gets folded when the first door 20 is open with the second door 40 closing the storage chamber 2 and when first door 20 is closed with the second door 40 opening the storage chamber 2 and when the first door 20 and the second door 40 open the storage chamber 2.

As the first door switch 16 and the second door switch 18 is able to sense the door opening and closing independently, the opening and closing of the two doors may be individually sensed.

Once it is sensed that the user opens one or more of the first and second doors 20 and 40, the motor 1300 is rotated in the reverse direction. Although not shown in the drawing, the motor 1300 is then rotated in the reverse direction to the direction mentioned referring to FIG. 6.

As shown in FIG. 7*a*, the first gear 1410 is rotated in the clockwise direction and the second gear 1430 is then rotated in the counter-clockwise direction. At this time, the third gear 1450 is also rotated in the counter-clockwise direction together with the second gear 1430.

As shown in FIG. 7*b*, when the rotation angle of the first gear 1410 becomes larger, the first extension 1440 of the second gear 1430 is coupled to the third extension 1102 of the first link 1100 by contact. As the first extension 1440 is moved in contact with the third extension 1102, the first elastic member 1030 becomes tensioned and the first link 1100 is rotated in the clockwise direction.

As the first link 1100 is rotated, the first contact piece 1104 is coupled to the first protrusion 110 and the pillar 100 gets then rotated in the folded direction.

As shown in FIG. 7*c*, while the first gear 1410 is being rotated continuously, the second extension 1460 gets coupled to the fourth extension 1122 by contact. While the first contact piece 1104 keeps the contact with the first protrusion 110, the pillar 100 may be rotated in the folded direction continuously.

Meanwhile, while the third gear 1450 is rotated together with the second gear 1430, the second extension 1460 gets coupled to the fourth extension 1122 by contact. While the second extension 1460 is contacting with the fourth extension 1122, the third gear 1450 is rotated together with the second link 1120. The rotating second link 1120 is able to keep the position preset not to interfere with the rotation of the pillar 100. Accordingly, the pillar 100 may stably move in the folded direction.

As shown in FIG. 7*d*, while the second extension 1460 is contacting with the fourth extension 1122, the third gear 1450 is able to restrict the rotation of the second link 1120 and the second elastic member 1050 becomes more tensioned during that time.

Meanwhile, unless the second gear 1430 contacts with the first link 1100, the external force applied for the tension of the first elastic member 1030 is removed and the first elastic member 1030 is restored to the original size such that the first link 1100 can go back to the original position.

As shown in FIG. 7*e*, the first gear 1410 is rotated further and the contact between the third gear 1450 and the second link 1120 is released and the second link 1120 is restored to the original position by the restoring force of the second elastic member 1050.

Meanwhile, unless the sensor senses that the folding or unfolding process of the pillar 100 is performed smoothly, the processes mentioned above may be performed again.

Unless the process for unfolding the pillar 100 is performed in the state where both of the first and second doors 20 and 40 close the storage chamber 2, the process described referring to FIG. 6 is performed again.

In contrast, unless the process for folding the pillar 100 is performed in the state where one of the first and second doors 20 and 40 opens the storage chamber 2, the process described referring to FIG. 7 is performed again.

In the embodiment, the user is able to check the operation of the pillar 100 by using the sensor 500 such that the reliability of the pillar folding or unfolding process may be enhanced.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A refrigerator comprising:

a cabinet;

an inner case that is located in the cabinet and that defines a storage chamber;

a first door rotatably coupled to the cabinet and configured to open and close a first side of the storage chamber;

a second door rotatably coupled to the cabinet and configured to open and close a second side of the storage chamber, the second door comprising a pillar that is configured to rotate relative to the second door and that is configured to contact the first door based on the first and second doors being closed and the pillar being oriented in an unfolded state;

a driving member that is located at a lower end of the second door, that is configured to move together with the second door, and that is configured to rotate the pillar toward the second door to a folded state or away from the second door to the unfolded state, wherein the pillar comprises a first protrusion and a second protrusion that are configured to selectively couple to the driving member, and wherein the pillar is positioned spaced apart from an upper wall and a lower wall of the inner case without contacting the inner case in a state in which the second door closes the second side of the storage chamber.

2. The refrigerator of claim 1, further comprising:

a first door switch configured to sense whether the first door opens or closes the first side of the storage chamber;

a second door switch configured to sense whether the second door opens or closes the second side of the storage chamber, wherein the driving member is configured to rotate the pillar from the unfolded state to the folded state based on at least one of the first door switch sensing the first door being oriented in a position that opens the first side or the second door switch sensing the second door being oriented in a position that opens the second side.

3. The refrigerator of claim 1, further comprising:

a first door switch configured to sense whether the first door opens or closes the first side of the storage chamber; and a second door switch configured to sense whether the second door opens or closes the second side of the storage chamber, wherein the driving member is configured to rotate the pillar from the folded state to the unfolded state based on both of the first door switch sensing the first door being oriented in a position that opens the first side and the second door switch sensing the second door being in a position that opens the second side.

4. The refrigerator of claim 1, wherein the first protrusion and the second protrusion are arranged at the pillar at different heights with respect to the lower wall of the inner case.

5. The refrigerator of claim 1, wherein the driving member comprises:

a first link configured to selectively contact the first protrusion; and a second link configured to selectively contact the second protrusion.

6. The refrigerator of claim 5, wherein the first link and the second link are located at different heights from each other with respect to the lower wall of the inner case.

7. The refrigerator of claim 6, wherein the driving member comprises:

a motor configured to rotate in a forward direction and a reverse direction; and a transmission unit configured to transmit rotation of the motor to the first link and the second link.

8. The refrigerator of claim 7, wherein the transmission unit comprises:

a first gear configured to receive rotation force from the motor;

a second gear configured to engage with the first gear; and a third gear configured to rotate together with the second gear in a direction that is equal to a rotation direction of the second gear.

9. The refrigerator of claim 8, wherein the second gear comprises a first extension configured to selectively contact the first link, and wherein the third gear comprises a second extension configured to selectively contact the second link.

10. The refrigerator of claim 8, further comprising a worm gear configured to transmit rotation of the motor to the first gear, wherein a rotation axis of the motor is perpendicular to a rotation axis of the first gear.

11. The refrigerator of claim 5, wherein the driving member comprises a case that defines an exterior of the driving member, the case comprising:

a first projection and a second projection;

a first elastic member that connects the first projection to the first link; and a second elastic member that connects the second projection to the second link.

12. The refrigerator of claim 11, wherein the case defines a through-hole that allows the first link and the second link to contact the pillar via the through-hole.

13. The refrigerator of claim 1, further comprising a sensor configured to sense rotation of the pillar.

14. The refrigerator of claim 13, wherein the driving member is configured to, based on the sensor sensing that the pillar has rotated outside of a preset state, repeat driving of the pillar toward the preset state.

15. The refrigerator of claim 1, further comprising a basket located vertically above the driving member.

16. The refrigerator of claim 1, wherein the pillar is located at a side surface of the second door that faces toward the first door, and wherein the driving member is configured to rotate the pillar toward the side surface from the unfolded state to the folded state or away from the side surface from the folded state to the unfolded state.

17. The refrigerator of claim 5, wherein the pillar is configured to:

rotate toward the second door from the unfolded state to the folded state based on the first link contacting the first protrusion; and rotate away from the second door from the folded state to the unfolded state based on the second link contacting the second protrusion.

18. The refrigerator of claim 6, wherein the first protrusion protrudes from a first position at the pillar corresponding to a height of the first link with respect to the lower wall of the inner case, wherein the second protrusion protrudes from a second position at the pillar corresponding to a height of the second link with respect to the lower wall of the inner case, and wherein the first position is located vertically above the second position.

19. The refrigerator of claim 8, wherein the second gear is configured to, based on rotation of the first gear, rotate about an axis by an angle in the rotation direction, and wherein the third gear is configured to, based on rotation of the second gear, rotate about the axis by the angle in the rotation direction together with the second gear.

20. The refrigerator of claim 14, wherein the sensor is located at a side surface of the second door that faces toward the first door, and wherein the sensor is configured to sense rotation of the pillar based on the pillar covering at least a portion of the sensor.

* * * * *